United States Patent
Seki

(10) Patent No.: US 10,814,865 B2
(45) Date of Patent: Oct. 27, 2020

(54) PARKING DEVICE

(71) Applicant: SUBARU CORPORATION, Tokyo (JP)

(72) Inventor: Junya Seki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 226 days.

(21) Appl. No.: 16/191,086

(22) Filed: Nov. 14, 2018

(65) Prior Publication Data

US 2019/0225209 A1 Jul. 25, 2019

(30) Foreign Application Priority Data

Jan. 24, 2018 (JP) .................................. 2018-009577

(51) Int. Cl.
*B60W 30/06* (2006.01)
*B60N 2/00* (2006.01)
*B60H 1/00* (2006.01)

(52) U.S. Cl.
CPC ........... *B60W 30/06* (2013.01); *B60H 1/0075* (2013.01); *B60H 1/00778* (2013.01);
(Continued)

(58) Field of Classification Search
CPC combination set(s) only.
See application file for complete search history.

(56) References Cited

U.S. PATENT DOCUMENTS 4,516,653 A * 5/1985 Walker ...................... B60S 9/20
180/199
6,832,206 B1 * 12/2004 Chelnik .................. G07B 15/02
235/31 R
(Continued)

FOREIGN PATENT DOCUMENTS

CN 107023194 A * 8/2017
DE 102012008858 A1 * 11/2012 ........... B62D 15/027
(Continued)

OTHER PUBLICATIONS

Japanese Notice of Reasons for Refusal issued in corresponding Japanese Patent Application No. 2018-009577, dated Oct. 8, 2019, with English translation.
(Continued)

*Primary Examiner* — Behrang Badii
*Assistant Examiner* — Jalal C Coduroglu
(74) *Attorney, Agent, or Firm* — McDermott Will & Emery LLP

(57) ABSTRACT

A parking device mountable on a vehicle and capable of parking autonomously includes an autonomous-parking-command receiver, a vehicle-occupant detector, and a determination unit. The autonomous-parking-command receiver receives a parking command given by a user to park the vehicle. The vehicle-occupant detector detects whether a vehicle occupant is in the vehicle. The determination unit determines whether to permit the vehicle to park. In a case where the autonomous-parking-command receiver receives the parking command and the vehicle-occupant detector does not detect the vehicle occupant, the determination unit determines permits parking and allows the vehicle to park autonomously. In a case where the autonomous-parking-command receiver receives the parking command and the vehicle-occupant detector detects the vehicle occupant, the determination unit does not permit parking and forbids the vehicle to park autonomously by commanding the autonomous-parking-command receiver to cancel the reception of the parking command.

19 Claims, 3 Drawing Sheets

(52) U.S. Cl.
CPC ..... *B60H 1/00878* (2013.01); *B60H 1/00964* (2013.01); *B60N 2/002* (2013.01); *B60W 2540/00* (2013.01); *B60W 2710/30* (2013.01); *B60W 2900/00* (2013.01)

(56) References Cited

U.S. PATENT DOCUMENTS

| | | | | |
|---|---|---|---|---|
| 8,098,174 | B2* | 1/2012 | Moshchuk | B62D 15/0285 |
| | | | | 340/932.2 |
| 8,912,924 | B2* | 12/2014 | Scofield | G07B 15/04 |
| | | | | 340/932.2 |
| 9,704,392 | B2* | 7/2017 | Wang | G08G 1/146 |
| 9,865,026 | B2* | 1/2018 | Silberberg | G06Q 10/00 |
| 10,684,627 | B2* | 6/2020 | Lavoie | B60T 1/00 |
| 10,705,220 | B2* | 7/2020 | Kim | G06T 7/521 |
| 2009/0042518 | A1 | 2/2009 | Ido et al. | |
| 2013/0093891 | A1* | 4/2013 | Tyrer | G06K 9/2018 |
| | | | | 348/148 |
| 2015/0088360 | A1* | 3/2015 | Bonnet | B60W 30/06 |
| | | | | 701/23 |
| 2015/0120403 | A1* | 4/2015 | Silberberg | G06Q 50/30 |
| | | | | 705/13 |
| 2015/0346727 | A1* | 12/2015 | Ramanujam | B62D 15/0285 |
| | | | | 701/23 |
| 2016/0371607 | A1* | 12/2016 | Rosen | G06Q 20/127 |
| 2017/0247918 | A1* | 8/2017 | Oomi | E05B 77/48 |
| 2017/0278311 | A1* | 9/2017 | Vespia | G06K 9/325 |
| 2017/0301241 | A1* | 10/2017 | Urhahne | B60Q 1/48 |
| 2017/0313314 | A1* | 11/2017 | Sen | B60W 30/16 |
| 2017/0323227 | A1* | 11/2017 | Sadeghi | G07B 15/02 |
| 2018/0072345 | A1* | 3/2018 | Nicodemus | G08G 1/168 |
| 2019/0225209 | A1* | 7/2019 | Seki | B62D 15/027 |
| 2020/0250977 | A1* | 8/2020 | Kim | G08G 1/143 |

FOREIGN PATENT DOCUMENTS

| | | | | |
|---|---|---|---|---|
| DE | 102014200611 | A1 * | 7/2015 | ........... B62D 15/027 |
| JP | 2002-063668 | A | 2/2002 | |
| JP | 2006-159939 | A | 6/2006 | |
| JP | 2009-043034 | A | 2/2009 | |
| JP | 2015-133050 | A | 7/2015 | |
| JP | 2018-169689 | A | 11/2018 | |
| WO | 2015/143153 | A1 | 9/2015 | |
| WO | 2016/173836 | A1 | 11/2016 | |
| WO | 2017/093196 | A1 | 6/2017 | |

OTHER PUBLICATIONS

Japanese Notice of Reasons for Refusal issued in corresponding Japanese Patent Application No. 2018-009577, dated Jul. 30, 2019, with English translation.

* cited by examiner

PARKING DEVICE

CROSS-REFERENCE TO RELATED APPLICATIONS

The present application claims priority from Japanese Patent Application No. 2018-009577 filed on Jan. 24, 2018, the entire contents of which are hereby incorporated by reference.

BACKGROUND

1. Technical Field

The present invention relates to parking devices installed in vehicles that are capable of parking autonomously.

2. Related Art

When parking a vehicle, such as an automobile, in a parking area, it is necessary to keep in mind not to leave a vehicle occupant, such as an infant who has no ability to open a door of the vehicle and exit the vehicle, remaining in the vehicle. For instance, Japanese Unexamined Patent Application Publication 2006-159939 discloses a technology in which, when a vehicle occupant is left remaining in a vehicle, a notification is provided using a warning sound or light or via a portable telephone.

SUMMARY OF THE INVENTION

An aspect of the present invention provides a parking device mountable on a vehicle and capable of parking autonomously. The parking device includes an autonomous-parking-command receiver, a vehicle-occupant detector, and a determination unit. The autonomous-parking-command receiver receives a parking command given by a user to park the vehicle. The vehicle-occupant detector detects whether a vehicle occupant is in the vehicle. The determination unit determines whether to permit the vehicle to park. In a case where the autonomous-parking-command receiver receives the parking command and the vehicle-occupant detector does not detect the vehicle occupant, the determination unit permits parking and allows the vehicle to park autonomously. In a case where the autonomous-parking-command receiver receives the parking command and the vehicle-occupant detector detects the vehicle occupant, the determination unit does not permit parking and forbids the vehicle to park autonomously by commanding the autonomous-parking-command receiver to cancel the reception of the parking command.

An aspect of the present invention provides a parking device mountable on a vehicle and capable of parking autonomously. The parking device includes circuitry. The circuitry receives a parking command given by a user to park the vehicle. The circuitry detects whether a vehicle occupant is in the vehicle. The circuitry determines whether to permit the vehicle to park. In a case where the parking command is received and the vehicle occupant is not detected, the circuitry permits parking and allows the vehicle to park autonomously. In a case where the parking command is received and the vehicle occupant is detected, the circuitry does not permit parking and forbids the vehicle to park autonomously canceling the reception of the parking command.

DETAILED DESCRIPTION

An example of the present invention will be described below with reference to the drawings.

In recent years, there have been developed vehicles that can autonomously travel to and park in parking areas, as well as management systems therefor. Since a vehicle to which such a system is applied is guided to a parking space where people normally do not enter, if a vehicle occupant is left remaining in the vehicle, there may be an increased risk of delayed discovery of the vehicle occupant left remaining in the vehicle by simply providing a notification using a warning sound or light or via a portable telephone.

It is desirable to provide a parking device in which, when a vehicle capable of parking autonomously is to be parked, the parking process is prevented from commencing in a state where a vehicle occupant is left remaining in the vehicle, so that accidents caused as a result of leaving the vehicle occupant in the vehicle can be avoided.

Figure 1:
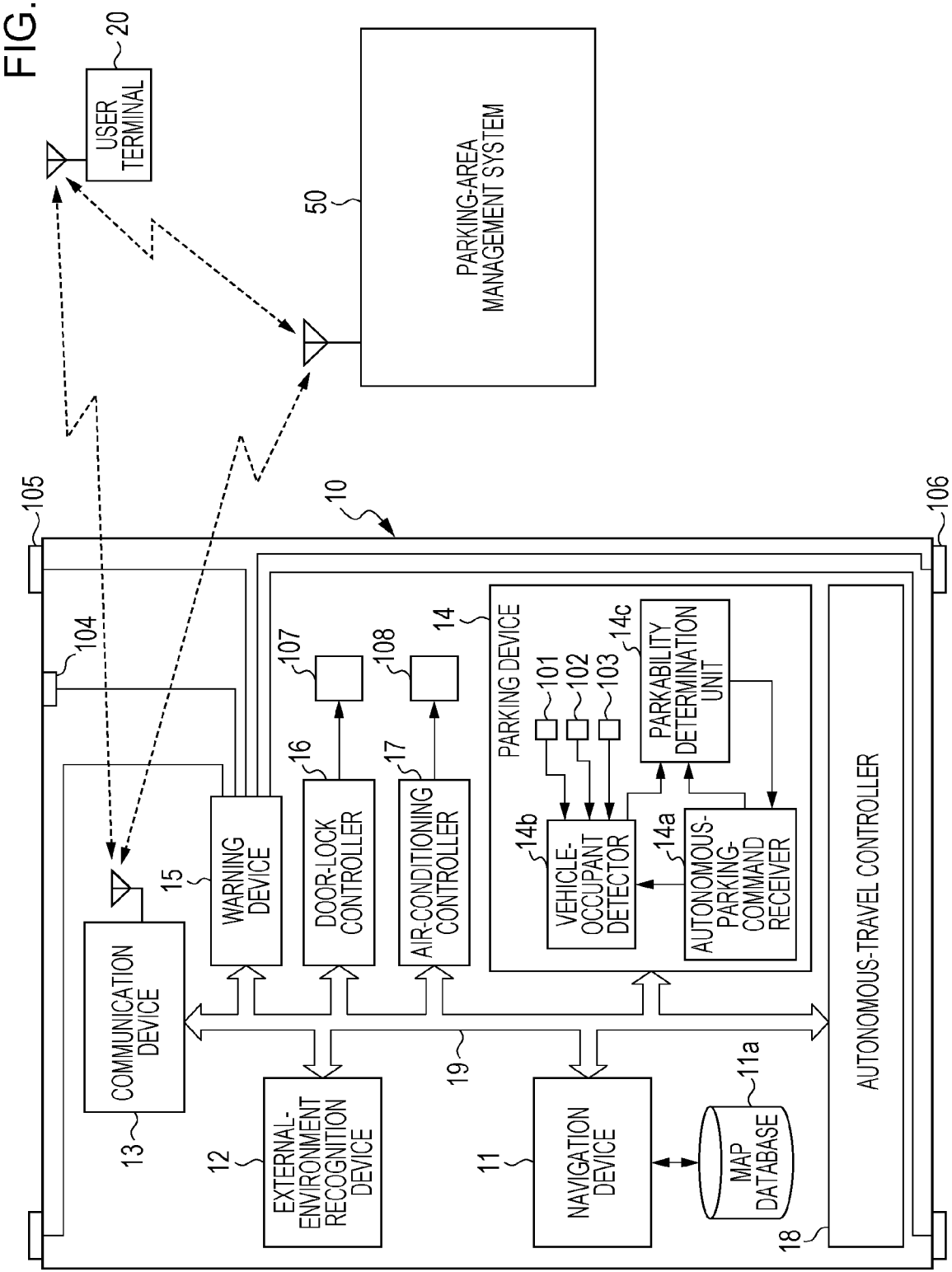
FIG. 1 schematically illustrates the configuration of a parking device installed in a vehicle.

In FIG. 1, reference sign 10 denotes a vehicle that can autonomously travel to and park in a predetermined parking area in response to a command from a user. The vehicle 10 is equipped with a parking device 14 that causes the vehicle 10 to park autonomously in, for instance, a parking area of a large-scale complex, having a plurality of commercial stores and venues, in response to a parking command from the user when the complex is visited.

In this example, the vehicle 10 travels autonomously to the parking area by communicating wirelessly with a portable user terminal 20 owned by the user and a parking-area management system 50 that manages a plurality of vehicles parked in the parking area, and then parks autonomously in a designated parking space. Specifically, the vehicle 10 includes an autonomous-travel controller 18 that enables autonomous traveling by controlling the driving of a power source, such as an engine and/or an electric motor. The autonomous-travel controller 18 is mainly constituted of a micro-computer and is coupled to other devices, such as a navigation device 11, an external-environment recognition device 12, a communication device 13, the parking device 14, a warning device 15, a door-lock controller 16, and an air-conditioning controller 17, via a communication bus 19 that constitutes an in-vehicle network.

The navigation device 11 includes a map database 11a, and measures the position of the vehicle 10 based on signals from a plurality of navigation satellites, such as global positioning system (GPS) satellites, and signals from in-vehicle sensors (such as a gyroscope sensor and a vehicle-speed sensor) and checks the measured position with the map database 11a. Then, the navigation device 11 presents routing assistance and traffic information to the driver by displaying them on a display device (not illustrated) based on the positional information on the map and traffic information acquired by infrastructure communication, such as road-to-vehicle communication and vehicle-to-vehicle communication.

Furthermore, the navigation device 11 generates routing assistance information to a destination from service-area map information received from the parking-area management system 50. The destination in this case is either one of an unoccupied parking space in the parking area, if the vehicle 10 is to stop at a drop-off location in the complex and then to travel autonomously to the parking area, and an unoccupied stopping space of a boarding location, if the vehicle 10 is to travel from the parking area to the boarding location.

The external-environment recognition device 12 includes various types of sensors such as a camera and a radar device that detect objects surrounding the vehicle 10, and recognizes the external environment surrounding the vehicle 10 based on detection information from these sensors and the map information and the traffic information from the navigation device 11. The recognition information about the external environment surrounding the vehicle 10 obtained by the external-environment recognition device 12 is transmitted to the autonomous-travel controller 18 and is used as control data for steering control for autonomous travel along a route, as well as braking control for preventing a collision with an obstacle.

The communication device 13 exchanges data with the user terminal 20 and the parking-area management system 50 by communicating therewith using a predetermined wireless communication method. The exchanging of data with the parking-area management system 50 based on wireless communication is executed by using either one of a local area network established in the service area of the parking-area management system 50 and a general-purpose network, such as the Internet, while required security is ensured.

The communication device 13 may be a dedicated device or may be used in a dual-purpose fashion as a communication device of the navigation device 11.

In this example, the autonomous-travel controller 18 communicates with the user terminal 20 and the parking-area management system 50 via the communication device 13, causes the vehicle 10 to travel autonomously from a drop-off location of the user to the parking area, and causes the vehicle 10 to stop and wait at a predetermined parking position. Then, when the autonomous-travel controller 18 receives a travel command from the parking-area management system 50, the autonomous-travel controller 18 causes the vehicle 10 to travel autonomously to a designated boarding location.

Specifically, the autonomous-travel controller 18 causes the vehicle 10 to travel autonomously to the destination in accordance with the routing assistance information generated by the navigation device 11 based on the map information from the parking-area management system 50. Moreover, if an obstacle is detected by the external-environment recognition device 12 during the travel to the destination, the autonomous-travel controller 18 executes either one of steering control and braking control to avoid a collision.

The autonomous traveling function of the vehicle 10 may at least include an autonomous traveling function that allows the vehicle 10 to travel unmanned to the parking area from the drop-off location in the service area of the parking-area management system 50.

The user terminal 20 is a portable terminal owned by the user using the vehicle 10 and is constituted of either one of a dedicated terminal having a wireless communication function and a general-purpose terminal. If a general-purpose terminal is used, for instance, any one of a portable telephone, such as a smartphone, a tablet terminal having a wireless communication function, and a notebook personal computer having a wireless communication function may be used and may have a dedicated application installed therein, thereby achieving a required function.

The vehicle 10 starts traveling autonomously to the parking area when a parking command transmitted from the user terminal 20 by the user exiting the vehicle 10 is received by the parking device 14. In this case, the parking device 14 checks whether there is any vehicle occupant still remaining in the vehicle 10 in response to the parking command from the user. If there is any vehicle occupant still remaining in the vehicle, the parking device 14 ensures safety by cancelling the reception of the parking command from the user.

The parking device 14 is mainly constituted of a microcomputer and includes an autonomous-parking-command receiver 14a, a vehicle-occupant detector 14b, and a determination unit 14c as main functional units. When the parking device 14 receives a parking command from the user terminal 20, the parking device 14 uses these functional units to detect whether there is any vehicle occupant in the vehicle so as to whether to permit the vehicle 10 to park. If the parking device 14 does not permit parking, the parking device 14 cancels the reception of the parking command so as to prevent a state where a vehicle occupant is left remaining in the vehicle 10.

Specifically, when the autonomous-parking-command receiver 14a receives a parking command for the vehicle 10 from the user terminal 20 via the communication device 13 that communicates with the user terminal 20, the autonomous-parking-command receiver 14a accepts this parking command from the user and requests the determination unit 14c to determine whether to permit the vehicle 10 to park. If the determination unit 14c does not permit the vehicle 10 to park, the autonomous-parking-command receiver 14a cancels the reception of the parking command and waits for a new parking command from the user. In one example, the communication device 13 may serve as a "communication unit".

When the autonomous-parking-command receiver 14a receives a parking command from the user, the vehicle-occupant detector 14b detects whether there is any vehicle occupant still remaining in the vehicle 10 in a state where the driver has exited the vehicle 10 and has locked the doors.

The vehicle-occupant detection result obtained by the vehicle-occupant detector 14b is transmitted to the determination unit 14c which determines whether to permit the vehicle 10 to park.

The presence or absence of a vehicle occupant left remaining in the vehicle 10 can be detected by, for instance, either one of a seat sensor 101 that detects pressure applied to a seat to detect the presence or absence of a vehicle occupant and a camera 102 serving as an imaging device that captures an image inside the vehicle cabin. More simply, a signal from a seatbelt switch 103 that is turned on when a tongue is inserted into a seatbelt buckle may be used.

When the autonomous-parking-command receiver 14a receives a parking command from the user, the determination unit 14c determines whether to permit the vehicle 10 to park based on the vehicle-occupant detection result obtained by the vehicle-occupant detector 14b. In accordance with the determination result, the autonomous travel to the parking area by the autonomous-travel controller 18 is permitted or forbidden.

Specifically, if the vehicle-occupant detector 14b does not detect a vehicle occupant in the vehicle 10, the determination unit 14c permits the vehicle 10 to park. Then, the autonomous travel to the parking area by the autonomous-travel controller 18 is permitted via the autonomous-parking-command receiver 14a.

In contrast, if the vehicle-occupant detector 14b detects a vehicle occupant in the vehicle 10, the determination unit 14c determines does not permit the vehicle 10 to park. Then, the autonomous-parking-command receiver 14a is commanded to cancel the reception of the parking command, the user terminal 20 is notified that the vehicle 10 is not allowed to park, and the autonomous travel to the parking area by the autonomous-travel controller 18 is forbidden.

Furthermore, in a case where the determination unit 14c does not permit parking, the determination unit 14c commands the warning device 15 to externally output a warning. For instance, in response to the command from the determination unit 14c, the warning device 15 cautions the environment surrounding the vehicle 10 by externally outputting a warning sound from a buzzer 104 and by blinking head lights 105 and rear lights 106.

Moreover, in a case where the determination unit 14c permits the vehicle 10 to park, the determination unit 14c gives a command for providing a notification to an external system, a command for forcedly actuating an air conditioner 108 via the air-conditioning controller 17, and a command for forcedly moving to a location where light entering from the outside can be suppressed.

The notification to the external system is executed in a case where the doors of the vehicle 10 are not opened even upon lapse of a preset time period after it is determined not to permit the vehicle 10 to park. The external system is notified via the communication device 13 that there is at least one vehicle occupant left remaining in the vehicle 10 even after the driver has exited the vehicle 10. In this example, the notification is provided to the parking-area management system 50 as the external system so as to request for help from a security guard.

When a security guard approaches the vehicle 10 as a result of the notification provided to the parking-area management system 50, the approaching security guard is authenticated and a door-lock actuator 107 is subsequently driven via the door-lock controller 16, so that the doors of the vehicle 10 are forcedly unlocked. The authentication of the security guard is performed by, for instance, communicating with a terminal carried by the security guard, so as to authenticate the approaching person as a security guard from the parking-area management system 50.

The air conditioner 108 is forcedly actuated by the air-conditioning controller 17 if the doors of the vehicle 10 are not opened even upon lapse of the preset time period after it is determined not to permit the vehicle 10 to park and if the interior temperature of the vehicle 10 becomes outside a preset temperature range. Accordingly, accidents, such as dehydration caused by high temperature and hypothermia caused by low temperature, can be prevented.

Furthermore, if the doors of the vehicle 10 are not opened even upon lapse of the preset time period after it is determined not to permit the vehicle 10 to park, if the interior temperature of the vehicle 10 becomes higher than or equal to a preset temperature, and if the vehicle 10 can be moved to a location, such as a shaded area, where light entering from the outside can be suppressed, the autonomous-travel controller 18 is actuated so as to forcedly move the vehicle 10. Accordingly, accidents, such as dehydration caused by high temperature and hypothermia caused by low temperature, can be prevented.

Figure 3:
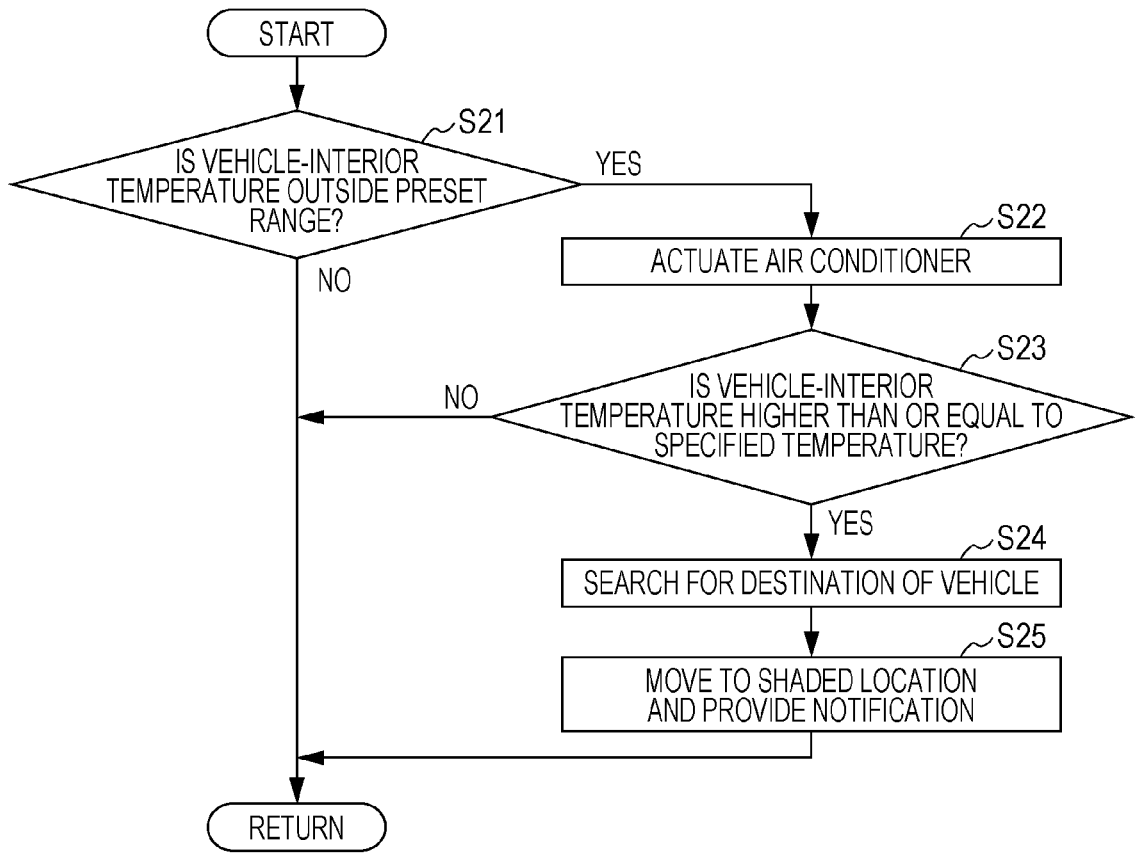
FIG. 3 is a flowchart illustrating an abnormal-vehicle-interior-temperature coping process.
Figure 4:
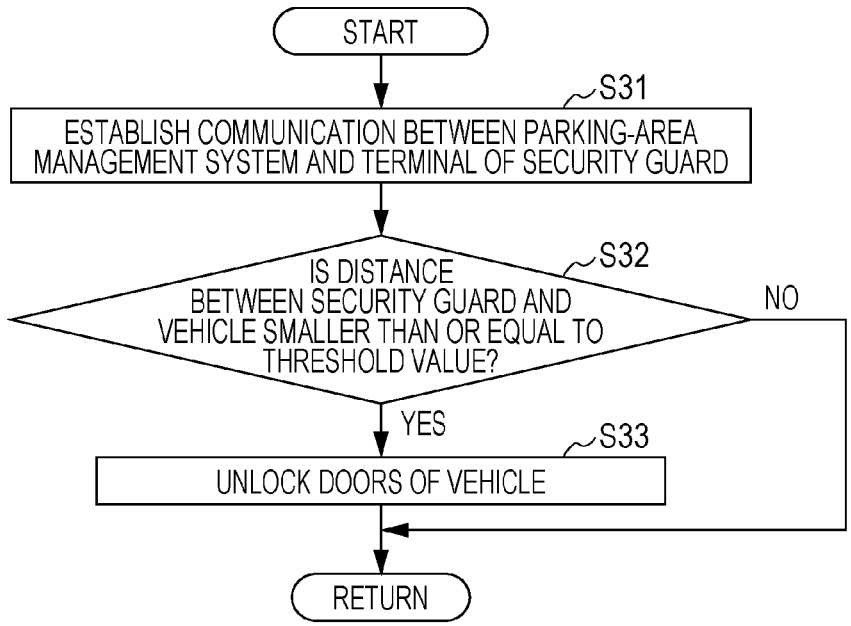
FIG. 4 is a flowcharting illustrating a door unlocking process for an approaching security guard.

Next, a parking process of the vehicle 10 will be described with reference to FIGS. 2 to 4. A flowchart in FIG. illustrates the parking process executed by the parking device 14 when the driver stops the vehicle 10 at a predetermined drop-off location and exits the vehicle 10. Flowcharts in FIGS. 3 and 4 illustrate sub-processes of the parking process in FIG. 2.

Figure 2:
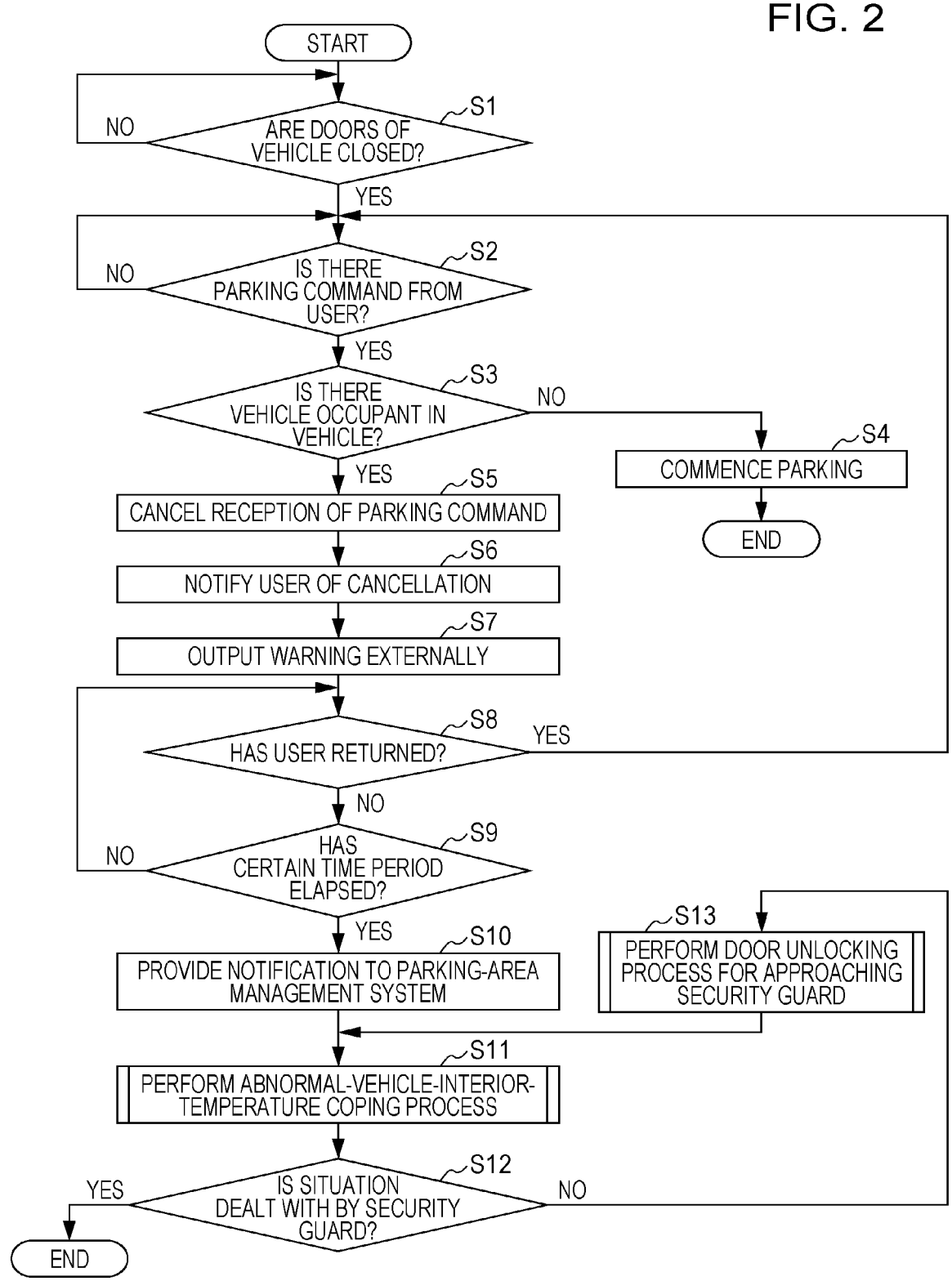
FIG. 2 is a flowchart illustrating a parking process.

The parking process in FIG. 2 includes step S1 where it is checked whether the doors of the vehicle 10 are closed and locked. If the doors are closed and locked, the process proceeds to step S2 involving waiting for a parking command from the user terminal 20. Then, when a parking command is received from the user terminal 20, the process proceeds from step S2 to step S3 where it is checked whether there is any vehicle occupant remaining in the vehicle 10.

If there is no vehicle occupant remaining in the vehicle 10, the process proceeds from step S3 to step S4 where the user is notified that the parking operation will commence in response to the parking command, and the autonomous-travel controller 18 is commanded to start the autonomous parking operation. In this example, the autonomous parking operation is executed under guidance according to communication between the parking-area management system 50 and the vehicle 10, such that the vehicle 10 autonomously travels to and parks in an unoccupied space in the parking area designated by the parking-area management system 50.

In contrast, if there is a vehicle occupant remaining in the vehicle 10, the process proceeds from step S3 to step S5 where the reception of the parking command is canceled. Then, in step S6, the user is notified via the user terminal 20 that the parking operation cannot be performed due to the vehicle occupant left remaining in the vehicle 10 and that the parking command has been canceled. Subsequently, in step S7, a warning is externally output by, for instance, turning on the buzzer 104 of the vehicle 10 and blinking the head lights 105 and the rear lights 106. The process then proceeds to step S8 involving waiting for the user to return.

In a case where the user returns after noticing either one of the notification provided to the user terminal 20 and the warning, the process returns from step S8 to step S2 involving waiting for a new parking command. If the user does not return, the process proceeds from step S8 to step S9 where it is checked whether a certain time period (e.g., 30 seconds) has elapsed. If the user does not return even upon the lapse of the certain time period, the process proceeds from step S9 to step S10 where the parking-area management system 50 is notified that the vehicle occupant is left remaining in the vehicle 10.

Then, after the parking-area management system 50 is notified in step S10, the process proceeds to step S11 where an abnormal-vehicle-interior-temperature coping process illustrated in FIG. 3 is executed. In this abnormal-vehicle-interior-temperature coping process, the air conditioner 108 is actuated or the vehicle 10 is moved to a shaded area in accordance with the vehicle-interior temperature, so that the vehicle occupant remaining in the vehicle 10 is prevented from experiencing accidents caused by high temperature and low temperature.

The abnormal-vehicle-interior-temperature coping process in FIG. 3 will now be described. This abnormal-vehicle-interior-temperature coping process includes step S21 where it is checked whether the vehicle-interior temperature of the vehicle 10 is outside a preset range. If the vehicle-interior temperature is not outside the preset range in step S21, the process returns to the parking process in FIG. 2 by exiting the abnormal-vehicle-interior-temperature coping process. If the vehicle-interior temperature is outside the preset range, the process proceeds from step S21 to step S22 where the air conditioner 108 is forcedly actuated via the air-conditioning controller 17.

Subsequently, the process proceeds to step S23 where it is checked whether the vehicle-interior temperature is higher than or equal to a specified high temperature. If the vehicle-interior temperature is within the preset range as a result of the actuation of the air conditioner 108 and has not reached the specified high temperature, the process exits the abnormal-vehicle-interior-temperature coping process from step S23. In contrast, in a case where the vehicle-interior temperature reaches the specified high temperature or higher even by actuating the air conditioner 108, the process proceeds from step S23 to step S24 involving searching for a destination in order to move the vehicle 10 to a location where the vehicle-interior temperature can be reduced by suppressing incoming external light, such as direct sunlight, that is causing the vehicle-interior temperature to increase.

Normally, the moving process of the vehicle 10 involves requesting the parking-area management system 50 to search for an appropriate location and moving the vehicle 10 to the location designated by the parking-area management system 50. The parking-area management system 50 searches for a shaded location where incoming external light, such as direct sunlight, can be suppressed based on, for instance, the vehicle-interior temperature of the vehicle 10, the air temperature of the surrounding area of the vehicle 10, the current time, and map information of locations where the vehicle 10 can park, and transmits information about the destination to the vehicle 10.

Subsequently, the process proceeds from step S24 to step S25 where the vehicle 10 is caused to travel autonomously to the designated destination in accordance with the map information of the shaded location received from the parking-area management system 50. When the vehicle 10 arrives at the destination, the parking-area management system 50 is notified of the arrival to the destination. In this case, the traveling of the vehicle 10 to the shaded location is desirably repeated, if possible, in accordance with the vehicle-interior temperature of the vehicle 10, changes in the environmental conditions, and the availability of locations where the vehicle 10 can park.

The destination of the vehicle 10 may alternatively be searched by the parking device 14 in the vehicle 10. In that case, the parking device 14 acquires the map information of locations where the vehicle 10 can park from the parking-area management system 50 and searches for a shaded location, where incoming external light, such as direct sunlight, can be suppressed, from the locations where the vehicle 10 can park based on the vehicle-interior temperature of the vehicle 10, the air temperature of the surrounding area of the vehicle 10, and the current time. Then, the vehicle 10 is moved to the found location, and the parking-area management system 50 is notified of the destination.

Subsequently, when the process returns to the parking process in FIG. 2 from the abnormal-vehicle-interior-temperature coping process in FIG. 3, the process proceeds from step S11 to step S12 where it is checked whether the situation is dealt with by a security guard of the parking-area management system 50 having received the notification. If the situation is not dealt with, the process proceeds to step S13 where a door unlocking process for an approaching security guard in FIG. 4 is executed. When the situation is completely dealt with by the security guard as a result of this process, the parking process ends.

In the door unlocking process for an approaching security guard, the parking device 14 of the vehicle 10 first establishes communication with terminals owned by security guards of the parking-area management system 50 in step S31. In this case, when the parking-area management system 50 receives a notification indicating that a vehicle occupant is left remaining in the vehicle 10, the parking-area management system 50 selects, for instance, a security guard who can most quickly reach the vehicle 10 from a plurality of security guards present in the service area based on the positional information of the vehicle 10 and the positional information of the security guards. Then, the parking-area management system 50 transmits, to the terminal owned by the selected security guard, information about, for instance, the position of the vehicle 10, the license plate number of the vehicle 10, and the vehicle model, and also activates the communication with the communication device 13 of the vehicle 10.

After the communication with the terminal owned by the security guard is established in step S31, the process proceeds to step S32 where it is checked whether the distance between the security guard and the vehicle 10 is smaller than or equal to a threshold value (e.g., 0.5 m) upon authentication performed based on the communication between the terminal owned by the security guard and the vehicle 10. When the distance between the security guard and the vehicle 10 becomes smaller than or equal to the threshold value such that the security guard approaches an area near the vehicle 10, the door-lock actuator 107 is actuated via the door-lock controller 16 so that the doors of the vehicle 10 are forcedly unlocked, whereby the vehicle occupant remaining in the vehicle 10 can be rescued.

Accordingly, in this example, when a vehicle capable of parking autonomously is to be parked in response to a parking command from a user, it is detected whether a vehicle occupant is on board. If a vehicle occupant is detected, parking is not permitted and the autonomous parking process is forbidden by canceling the parking command, so that the parking process does not commence with the vehicle occupant left remaining in the vehicle. In other words, in a case where a vehicle occupant is left remaining in the vehicle, the autonomous parking process will not commence with the vehicle occupant left remaining in the vehicle, so that delayed discovery of the vehicle occupant left remaining in the vehicle is prevented, whereby accidents caused as a result of leaving a vehicle occupant in the vehicle can be avoided.

The invention claimed is:

1. A parking device mountable on a vehicle and capable of parking autonomously, the parking device comprising:
    an autonomous-parking-command receiver configured to receive a parking command given by a user to park the vehicle;
    a vehicle-occupant detector configured to detect whether a vehicle occupant is in the vehicle; and
    a determination unit configured to determine whether to permit the vehicle to park,
    wherein, in a case where the autonomous-parking-command receiver receives the parking command and the vehicle-occupant detector does not detect the vehicle occupant, the determination unit permits parking and allows the vehicle to park autonomously, and wherein, in a case where the autonomous-parking-command receiver receives the parking command and the vehicle-occupant detector detects the vehicle occupant, the determination unit does not permit parking and forbids the vehicle to park autonomously by commanding the autonomous-parking-command receiver to cancel the reception of the parking command.

2. The parking device according to claim 1,
    wherein the vehicle-occupant detector comprises either one of a seat sensor configured to detect that the vehicle occupant is seated in a seat and an imaging device configured to capture an image inside the vehicle.

3. The parking device according to claim 1, further comprising:

a communication unit configured to communicate with a portable terminal owned by the user, wherein, if the determination unit does not permit parking of the vehicle, the determination unit provides a notification indicating that parking is not permitted to the portable terminal via the communication unit.

4. The parking device according to claim 2, further comprising:

a communication unit configured to communicate with a portable terminal owned by the user, wherein, if the determination unit does not permit parking of the vehicle, the determination unit provides a notification indicating that parking is not permitted to the portable terminal via the communication unit.

5. The parking device according to claim 3, wherein, if a door of the vehicle is not opened even upon lapse of a preset time period after it is determined not to permit the vehicle, the determination unit provides a notification externally via the communication unit.

6. The parking device according to claim 4, wherein, if a door of the vehicle is not opened even upon lapse of a preset time period after it is determined not to permit the vehicle, the determination unit provides a notification externally via the communication unit.

7. The parking device according to claim 1, wherein, if the determination unit does not permit the vehicle to park, the determination unit causes a warning to be output externally to caution an environment surrounding the vehicle.

8. The parking device according to claim 2, wherein, if the determination unit does not permit the vehicle to park, the determination unit causes a warning to be output externally to caution an environment surrounding the vehicle.

9. The parking device according to claim 3, wherein, if the determination unit does not permit the vehicle to park, the determination unit causes a warning to be output externally to caution an environment surrounding the vehicle.

10. The parking device according to claim 4, wherein, if the determination unit does not permit the vehicle to park, the determination unit causes a warning to be output externally to caution an environment surrounding the vehicle.

11. The parking device according to claim 1, wherein, if a door of the vehicle is not opened even upon lapse of a preset time period after it is determined not to permit the vehicle and if a vehicle-interior temperature of the vehicle becomes outside a preset temperature range, the determination unit forcedly actuates an air conditioner of the vehicle.

12. The parking device according to claim 2, wherein, if a door of the vehicle is not opened even upon lapse of a preset time period after it is determined not to permit the vehicle and if a vehicle-interior temperature of the vehicle becomes outside a preset temperature range, the determination unit forcedly actuates an air conditioner of the vehicle.

13. The parking device according to claim 3, wherein, if a door of the vehicle is not opened even upon lapse of a preset time period after it is determined not to permit the vehicle and if a vehicle-interior temperature of the vehicle becomes outside a preset temperature range, the determination unit forcedly actuates an air conditioner of the vehicle.

14. The parking device according to claim 4, wherein, if a door of the vehicle is not opened even upon lapse of a preset time period after it is determined not to permit the vehicle and if a vehicle-interior temperature of the vehicle becomes outside a preset temperature range, the determination unit forcedly actuates an air conditioner of the vehicle.

15. The parking device according to claim 1, wherein, if a door of the vehicle is not opened even upon lapse of a preset time period after it is determined not to permit the vehicle and if a vehicle-interior temperature of the vehicle becomes higher than or equal to a preset temperature, the determination unit forcedly moves the vehicle to a location where incoming external light is suppressible.

16. The parking device according to claim 2, wherein, if a door of the vehicle is not opened even upon lapse of a preset time period after it is determined not to permit the vehicle and if a vehicle-interior temperature of the vehicle becomes higher than or equal to a preset temperature, the determination unit forcedly moves the vehicle to a location where incoming external light is suppressible.

17. The parking device according to claim 3, wherein, if a door of the vehicle is not opened even upon lapse of a preset time period after it is determined not to permit the vehicle and if a vehicle-interior temperature of the vehicle becomes higher than or equal to a preset temperature, the determination unit forcedly moves the vehicle to a location where incoming external light is suppressible.

18. The parking device according to claim 4, wherein, if a door of the vehicle is not opened even upon lapse of a preset time period after it is determined not to permit the vehicle and if a vehicle-interior temperature of the vehicle becomes higher than or equal to a preset temperature, the determination unit forcedly moves the vehicle to a location where incoming external light is suppressible.

19. A parking device mountable on a vehicle and capable of parking autonomously, the parking device comprising circuitry configured to receive a parking command given by a user to park the vehicle;

detect whether a vehicle occupant is in the vehicle; and determine whether to permit the vehicle to park, wherein, in a case where the parking command is received and the vehicle occupant is not detected, the circuitry permits parking and allows the vehicle to park autonomously, and wherein, in a case where the parking command is received and the vehicle occupant is detected, the circuitry does not permit parking and forbids the vehicle to park autonomously canceling the reception of the parking command.

\* \* \* \* \*